Oct. 6, 1953   J. R. SCHMIDGALL   2,654,451
FRAME CONSTRUCTION
Filed Nov. 13, 1950   2 Sheets-Sheet 1
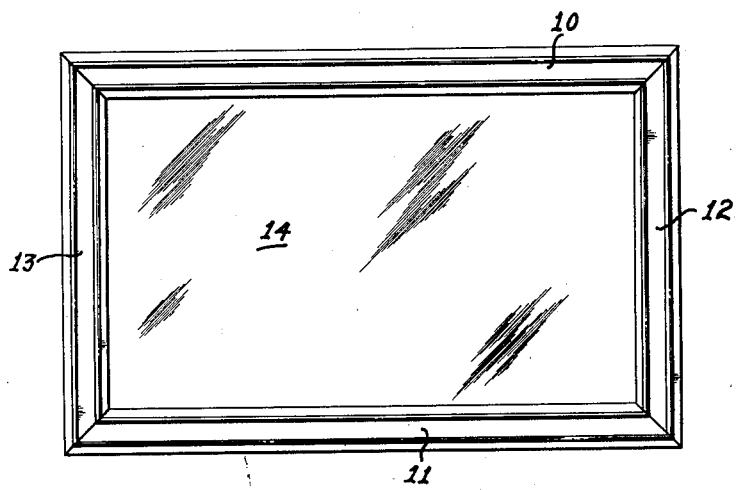
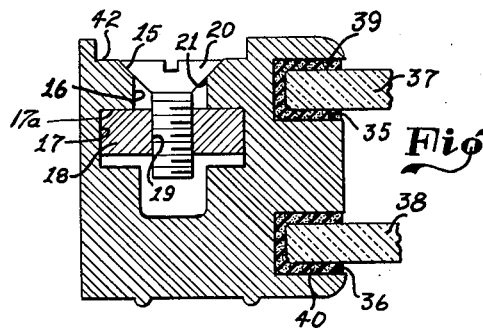
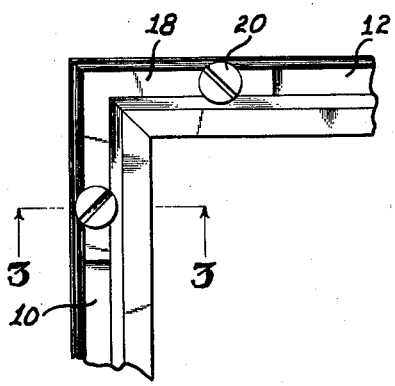
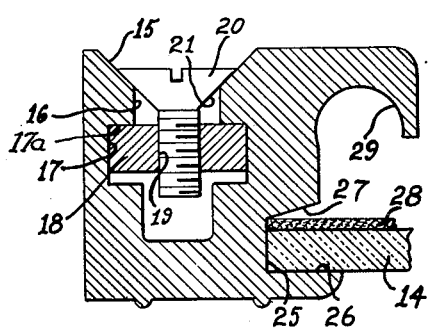
JOHN R. SCHMIDGALL,
INVENTOR.
HUEBNER, BEEHLER,
WORREL, HERZIG & CALDWELL,
ATTORNEYS.

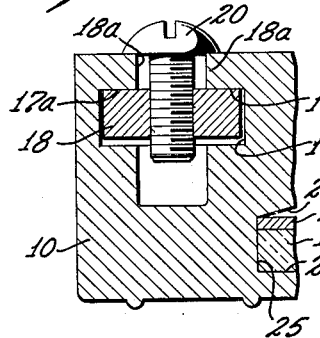
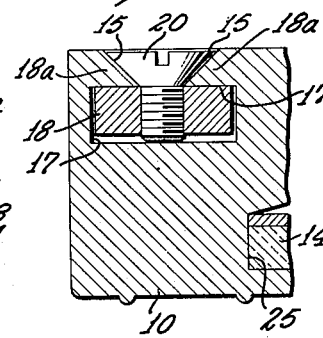
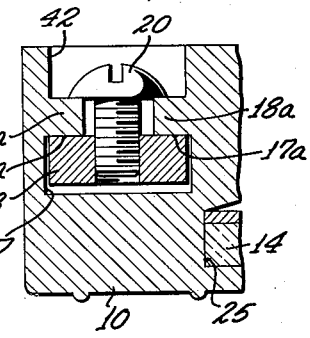
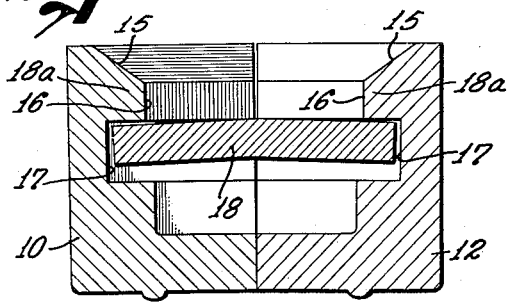
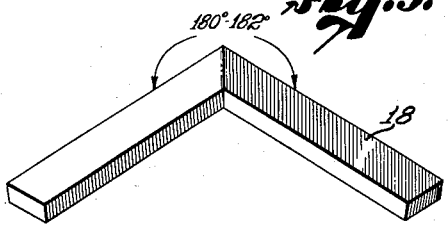
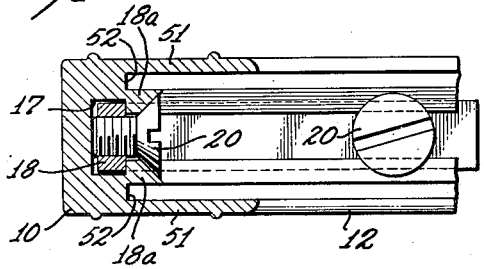
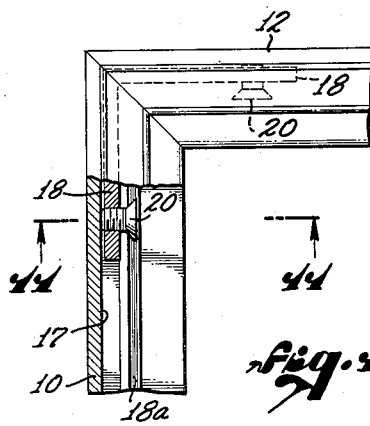
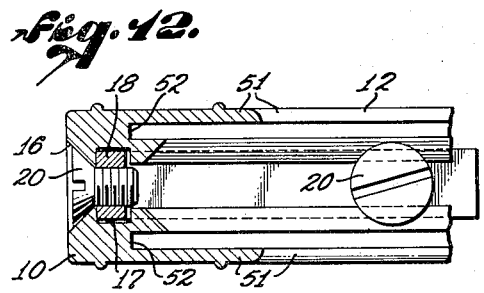

Patented Oct. 6, 1953

2,654,451

UNITED STATES PATENT OFFICE 2,654,451

FRAME CONSTRUCTION

John R. Schmidgall, Los Angeles, Calif.

Application November 13, 1950, Serial No. 195,420

14 Claims. (Cl. 189—76)

This invention relates to structural joint means and more particularly to a means for joining the elongate frame or side members of a picture frame or the like. This is a continuation-in-part of my copending application, Serial No. 59,494, filed November 12, 1948, for Frame Structure, now abandoned.

It is an object of this invention to provide a structural joint by means of which abutting structural members may be quickly engaged and disengaged.

It is another object of this invention to provide an improved picture frame in which the side or frame members may be quickly disengaged at their abutting joint to permit insertion of a picture or the like.

It is a further object of this invention to provide a frame having an inwardly directed groove into which a picture, mirror, pane of glass, or the like may be inserted, and characterized by quickly engageable and disengageable joint means at the corners of the frame by means of which the frame members may be separated for the insertion of the picture or similar article.

It is a further object of this invention to provide a frame which may be dismantled and reassembled repeatedly without deterioration or other adverse effects of such use.

It is still a further object of this invention to provide a separable picture frame in which exposed edges are fully finished so that the securing members holding the corner joints together are invisible.

It is a still further object of this invention to provide a picture frame having a corner-connecting structure in which accuracy of assembly is not required in order to produce a neat appearing joint.

In accordance with these and other objects which will become apparent throughout the ensuing specification several species of the instant invention will now be described with reference to the drawings, wherein;

Figure 1 is an obverse view of a complete picture frame embodying the instant invention;

Figure 2 is a fragmentary reverse view of one corner illustrating the manner of joining corners;

Figure 3 is a cross-section taken on line 3—3 of Figure 2;

Figure 4 is a view similar to Figure 3 illustrating a modification of the invention;

Figures 5, 6, and 7 are additional views similar to Figure 3 illustrating several different species of the instant invention;

Figure 8 is a sectional view taken along line 8—8 in Figure 2 illustrating a modified form of connecting member;

Figure 9 is a perspective view of the modified connecting member of Figure 8;

Figure 10 is a view similar to Figure 2 showing another form of joint;

Figure 11 is a cross-section taken on line 11—11 of Figure 10; and

Figure 12 is a view similar to Figure 11 showing a modified form of joint.

Referring to the drawings, numerals 10, 11, 12, and 13 designate, respectively, structural members, in this case co-planar, elongate frame or side members, forming a frame for a picture, mirror, or other flat object, designated 14.

In accordance with the instant invention, the corner joints between the frame members 10, 11, 12, and 13 are constituted as shown in Figure 2, wherein there is illustrated by way of example the joint between the frame members 10 and 12. Whereas, Figure 1 represents the front or obverse side of the frame, Figure 2 shows the back or reverse side. Each of the frame members is provided, in a surface facing the common plane of the members, with a longitudinal, undercut groove 17, including inwardly extending ledges or shoulders 18a having chamfered outer surfaces 15 and inner surfaces 17a. The ends of the grooves 17 are coterminous, as illustrated in Figure 2, thereby constituting continuous groove means, in which a single elongate angular connecting member 18 is placed to join the two frame members 10 and 12 in end abutting relation. As seen in Figure 2, one leg of the angular member 18 fits into the groove in each of the members 10 and 12.

Expressed in other words, each of the members 10 and 12 may be regarded as being formed with an elongate recess 17 extending into the member from an abutting surface and having a slot 16 communicating between the recess 17 and the surface of the frame member. The slot 16 being narrower than the recess 17, there remains the overhanging ledges or shoulders 18a.

The connecting means may alternatively be regarded as including a longitudinal V-shaped groove, denoted by the numeral 15, a rectangular shaped groove 16 having a depth greater than its width and intersecting the V-shaped groove 15, and a second rectangular shaped groove 17 having a width greater than its depth and a width greater than the width of the groove 16 and intersecting the groove 16. Thus expressed, the structure defines the inwardly directed ledges or shoulders 18a having the outer surface denoted also by the numeral 15 and the inner or under surface denoted by the numeral 17a.

The angular connecting member 18 is provided with a pair of threaded apertures 19, one in each leg, into each of which is screwed a V-headed machine screw 20 having a conical surface 21 on the under side of the head which engages, with wedging action, the chamfered surface 15.

Each of the frame members 10, 11, 12 and 13 is formed with an inwardly directed panel-receiving groove 25 having a straight wall 26 and a tapered wall 27. When the frame is used to contain a picture, the panel 14 is of glass and fits against the flat wall 26 in the groove 25 with a paper mat 28 backing up the glass 14 and fitting between the glass and the tapered wall 27 shown in Figure 3. The paper mat being somewhat resilient or compressible, the tapered wall 27 insures a stable fit of the glass within the frame and tends to obviate rattling when the frame is moved.

When the frame is used in connection with a serving tray, a semi-circular groove 29 receives a resilient gasket (not shown) upon which the tray bottom may rest.

The instant invention is adaptable for use to hold a double pane glass window, as shown in Figure 4. In this figure the junction means is substantially as shown in Figure 3 with a modification in the form of additional recess 42 adapted to receive a strip of decorative trim, thereby to hide the groove and screws. In the Figure 4 modification a pair of interior grooves 35 and 36 are provided, receiving respectively the glass panes 37 and 38 with gaskets 39 and 40 interposed between the edges of the glass and the grooves. The gaskets serve both to seal the structure against passage of air or misture, and also to protect the edges of the glass from chipping by the frame.

In Figure 5 there is shown a somewhat simpler form of the instant invention. In this figure the outer surfaces of the ledges 18a are not chamfered, or otherwise relieved, the head of the round head screw 20 merely abutting the upper surfaces of the ledges and projecting above the surface of the frame member 10. The modification of Figure 5, like those of Figures 3 and 4, contains the common feature of having the screw head bearing against the outer surfaces of the ledges 18a, so that tightening of the screw brings the connecting member 18 into frictionally binding engagement against the inner surface 17a of the ledges 18a, thereby holding the frame members 10, 11, 12, and 13 in firm, end-abutting relation.

In the Figure 6 species, the upper surfaces of the ledges or shoulders 18a are relieved as by chamfering, as shown at 15. This serves the double purpose of recessing the V-head of the screw 20 flush or beneath the surface of the frame member 10, and also provides a wedging action between the head of the screw 20 and the contiguous chamfered surfaces 15. This figure also illustrates that the groove 17 need not be deepened in the center to accommodate the screw 20, as in Figures 3, 4, and 5.

In the modification shown in Figure 7, the relieving of the ledges 18a assumes the form of a rectangular groove 42 so that a conventional round-headed screw 20 may be employed therein. The groove 42 may be made deep enough, not only to fully recess the screw 20, but also to receive decorative and concealing trim, as discussed hereinbefore in connection with Figure 4. This figure also illustrates that the screw 20 need not protrude from the bottom of the member 18, as in Figures 3, 4, 5, and 6.

In order to widen the fabrication tolerances, so that less precision in forming and assembly is required, it may be advisable at times to give the connecting member 18 a slight bend at the junction point between abutting frame members, as shown in Figures 8 and 9. This bend is for the purpose of closing up any gap that might remain between the mitered end surfaces of the frame member.

As shown in Figure 8, the connecting member 18 has a bend of approximately one degree, and preferably less than two degrees, at the point where it passes between the frame members 10 and 12. The axis of this bend, as shown in Figure 8, is parallel to the common plane of the frame members. The effect of the bend in the member 18 is to cant the joint slightly toward the front or obverse face of the picture frame, so as to definitely preclude the appearance of any crack in the obverse face of the joint. There is thus a tendency to open a crack at the reverse side of the frame, but this is generally unobjectionable because, as a rule, it is hidden from view.

The embodiments of the instant invention heretofore discussed are all characterized by the fact that the joint-forming grooves extend into the frame members from a surface which faces the common plane of all the frame members.

In the embodient shown in Figures 10 and 11, the grooves 17, instead of extending from the common plane, are placed on the inside of the frame member, so that the screw heads cannot be seen from either the obverse or reverse side of the frame.

This modification is further characterized as shown in Figure 11 by the formation of exterior walls 51 on the obverse and reverse faces of the frame which are spaced from the ledges 18a so as to form a pair of panel-receiving grooves 52 adapted to receive flat panels such as panes of glass. The embodiment shown in Figures 10 and 11 may be used with panels in either one or both of the grooves 52. If both of the grooves 52 are used, it is preferred to obtain access to at least two of the securing screws 20 by forming the slot 16 on the exterior, rather than the interior of the frame member as shown in Figure 12. Instead of an elongate slot, the opening 16 may, and preferably is, simply a counter-sunk hole. In this way, the screws 20 may be tightened to draw the connecting member 18 against the bottom of the groove 17, even though both of the grooves 52 are occupied by panels which would otherwise block access to the head of the screws 20 were they to be positioned as shown in Figure 11.

From the above descriptions, it will be seen that the structural joint means of the instant invention is characterized by elongate recesses extending into a pair of structural members from the abutting surfaces of the structural members, each recess having a slot communicating between the surface of the member and at least a portion of the recess. This slot is narrower than the recess, thereby leaving a pair of ledges or shoulders bordering the slot and overhanging the recess. This structure will also be recognized as constituting an undercut groove having the said ledges or shoulders. Into the recesses extends an elongate structural member having a screw passing between the ledges with the head of the screw bearing against the other surfaces of the ledges thereby to clamp the connecting member into frictionally binding engagement against the inner surfaces of the ledges to hold the structural members in abutting relation.

While the instant invention has been shown and described herein in what is conceived to be the most practical and preferred embodiment, it is recognized that departures may be made therefrom within the scope of the invention, which is therefore not to be limited to the details disclosed herein, but is to be accorded the full scope of the claims so as to embrace any and all equivalent methods and apparatus.

I claim:

1. A structural joint for a frame member adapted to enclose a panel comprising a pair of side members having a plurality of flat surfaces and abutting in angular relation, each of said side members being formed with a longitudinal V-shaped groove, a longitudinal rectangular-shaped groove having a depth greater than its width and intersecting said V-shaped groove, and a second longitudinal rectangular-shaped groove having a width greater than its depth and a width greater than the width of said first-mentioned groove intersecting said first-mentioned rectangular groove, and defining in conjunction therewith a pair of inwardly directed longitudinal shoulders having an undersurface and a connecting member formed with a pair of legs having a width and thickness slightly less than the width and thickness of said second-mentioned rectangular groove and adapted to be slidably disposed therein, each of said legs being formed with a threaded aperture therein adapted to receive a machine screw having a V-shaped head, whereby upon being threaded into said leg to cause a frictional binding between said leg and said inwardly directed shoulders, and a wedging engagement between said screw head and said V-shaped groove.

2. A structural joint for a frame member adapted to enclose a panel comprising a pair of side members having a plurality of substantially flat surfaces and abutting in angular relation, each of said side members being formed with a longitudinal V-shaped groove in one surface thereof, a longitudinal rectangular-shaped groove having a depth greater than its width and intersecting said V-shaped groove, and a second longitudinal rectangular-shaped groove having a width greater than its depth and a width greater than the width of said first-mentioned groove intersecting said first-mentioned rectangular groove, and defining in conjunction therewith a pair of inwardly directed longitudinal shoulders having an undersurface and a connecting member formed with a pair of legs having a width and thickness slightly less than the width and thickness of said second-mentioned rectangular groove and adapted to be slidably disposed therein, each of said legs being formed with a threaded aperture therein adapted to receive a machine screw having a V-shaped head whereby upon being threaded into said leg to cause a frictional binding between said leg and said inwardly directed shoulders, and to cause a wedging engagement between said head and said V-shaped groove, said side members being also formed with a panel receiving groove in one surface at right angles to said first-mentioned surface adapted to receive a panel to be held in said frame.

3. A structural joint for a frame member adapted to enclose a panel comprising a pair of side members abutting in angular relation, each of said side members being formed with a longitudinal V-shaped groove, a longitudinal rectangular-shaped groove having a depth greater than its width and intersecting said V-shaped groove, and a second longitudinal rectangular-shaped groove having a width greater than the width of said first-mentioned groove intersecting said first-mentioned rectangular groove, and defining in conjunction therewith a pair of inwardly directed longitudinal shoulders having an undersurface and a connecting member formed with a pair of legs having a width and thickness slightly less than the width and thickness of said second-mentioned rectangular groove and adapted to be slidably disposed therein, each of said legs being formed with a threaded aperture therein adapted to receive a machine screw having a V-shaped head whereby upon being threaded into said leg to cause a frictional binding between said leg and said inwardly directed shoulders, and to cause a wedging engagement between said head and said V-shaped groove, said side members also being formed with a panel receiving groove adapted to receive said panel to complete said structure.

4. A structural joint for a frame member comprising a pair of side members abutting in angular relation, each of said side members being formed with a longitudinal V-shaped groove, a longitudinal rectangular-shaped groove intersecting said V-shaped groove, and a second longitudinal rectangular-shaped groove having a width greater than the width of said first-mentioned groove intersecting said first-mentioned rectangular groove, and defining in conjunction therewith a pair of inwardly directed longitudinal shoulders having an undersurface and a connecting member formed with a pair of legs having a width and thickness slightly less than the width and thickness of said second-mentioned rectangular groove and adapted to be slidably disposed therein, each of said legs being formed with a threaded aperture therein adapted to receive a machine screw having a V-shaped head whereby upon being threaded into said leg to cause a frictional binding between said leg and said inwardly directed shoulders and to cause a wedging engagement between said head and said V-shaped groove, said side members also being formed with a panel receiving groove adapted to receive said panel to complete said structure.

5. A structural joint comprising a pair of frame members in angular abutting relation, each of said frame members being formed with a longitudinal V-shaped groove and a rectangular groove subadjacent thereto defining in conjunction therewith inwardly directed longitudinal shoulders having an undersurface and a connecting member formed with a pair of legs having a width and thickness slightly less than the width and thickness of said second-mentioned rectangular groove and adapted to be slidably disposed therein, each of said legs being formed with a threaded aperture therein adapted to receive a machine screw having a V-shaped head whereby upon being threaded into said leg to cause a frictional binding between said leg and said inwardly directed shoulders and to cause a wedging engagement between said head and said V-shaped groove, said frame members also being formed with a panel-receiving groove adapted to receive said panel to complete said structure.

6. A structural joint for a frame member comprising a pair of side members in end abutting relation, each of said side members being formed with a longitudinal V-shaped groove, a longitudinal rectangular-shaped groove intersecting said V-shaped groove, and a second longitudinal rectangular-shaped groove having a width greater than the width of said first-mentioned rectangular-shaped groove intersecting such groove, and defining in conjunction therewith a pair of inwardly directed longitudinal shoulders having an undersurface, and a connecting member having a width and thickness slightly less than the respective dimensions of said second-mentioned rectangular groove and adapted to be slidably disposed therein, said member being formed with threaded aperture therein, machine screws each having a V-shaped head and threaded into said member to cause a frictional binding between said member and said inwardly directed shoulders and to cause a wedging engagement between said head and said V-shaped groove.

7. A structural joint for a frame member adapted to enclose a panel comprising a pair of side members having a plurality of flat surfaces and in end abutting relation, each of said side members being formed with a longitudinal V-shaped groove, a longitudinal rectangular-shaped groove having a depth greater than its width and intersecting said V-shaped groove, and defining in conjunction therewith a pair of inwardly directed longitudinal shoulders having an undersurface, a connecting member having a width and thickness slightly less than the respective dimensions of said rectangular groove and adapted to be slidably disposed therein, said connecting member being formed with a threaded aperture therein, machine screws each having a V-shaped head and threaded into said connecting member to cause a frictional binding between said member and said inwardly directed shoulders and to cause a wedging engagement between said screw head and said V-shaped groove.

8. A frame joint comprising in combination a pair of frame members in end abutting relation, each member having therein a longitudinal undercut groove including inwardly extending ledges, being undersurfaces and outer surfaces, said outer surfaces being chamfered to form a seat for a V-shaped screw head, the ends of the grooves being coterminous to form in effect continuous groove means, a connecting member disposed partially in one groove and partially in the other thereby forming a junction between said structural members, and a pair of V-shaped screws in said connecting member passing between said ledges with their heads bearing against the chamfered outer surfaces of said ledges, one screw being disposed in each of said grooves thereby to bring said connecting member into frictionally binding engagement with the inner surfaces of the ledges of each of said grooves to hold said frame members in abutting relation.

9. A frame joint comprising in combination a pair of frame members in end abutting relation, each member having therein a longitudinal undercut groove including inwardly extending ledges, having outer and inner surfaces, the outer edges of said ledges being relieved to receive the head of a screw, the ends of the grooves being coterminous to form in effect continuous groove means, an elongate connecting member disposed in said groove forming a junction between said structural members, and a pair of screws in said connecting member passing between said ledges with their heads bearing against the relieved outer surfaces of said ledges, one screw being disposed in each of said grooves thereby bringing said connecting member into frictionally binding engagement with the inner surfaces of the ledges of each of said grooves to hold said frame members in abutting relation.

10. A frame joint comprising in combination a pair of elongate co-planar frame members in end abutting relation, each frame member having, in a surface facing the common plane, a longitudinal undercut groove including inwardly extending ledges having outer and inner surfaces, the ends of the grooves being coterminous, an elongate connecting member disposed partially in one groove and partially in the other and having a bend of less than 2° where it passes between said frame members, the axis of said bend being parallel to said plane, and a pair of screws in said connecting member disposed normal to said plane and passing between said ledges with their ends bearing against the outer surfaces of said ledges, one screw being disposed in each of said grooves thereby to bring said connecting member into frictionally binding engagement with the inner surfaces of the ledges of each of said grooves to hold said frame members in abutting relation.

11. A frame joint comprising in combination a pair of elongate co-planar frame members in end abutting relation, each frame member having in a surface facing the common plane, a longitudinal undercut groove including inwardly extending ledges having outer and inner surfaces, the ends of the grooves being coterminous, an elongate connecting member disposed partially in one groove and partially in the other, and a pair of screws in said connecting member disposed normal to said plane and passing between said ledges with their heads bearing against the outer surfaces of said ledges, one screw being disposed in each of said grooves thereby to bring said connecting member into frictionally binding engagement with the inner surfaces of the ledges of each of said grooves to hold said frame members in abutting relation.

12. A frame joint comprising in combination a pair of elongate frame members in end abutting relation, each frame member having therein a longitudinal undercut groove including inwardly extending ledges having outer and inner surfaces, the ends of the grooves being coterminous to form in effect continuous groove means, an elongate connecting member disposed partially in one groove and partially in the other thereby forming a junction between said frame members, and a pair of screws in said connecting member passing between said ledges with their heads bearing against the outer surfaces of said ledges, one screw being disposed in each of said grooves thereby to bring said connecting member into frictionally binding engagement with the inner surfaces of the ledges of each of said grooves to hold said frame members in abutting relation.

13. Structural joint means comprising in combination a pair of structural members in abutting relation, each structural member having therein an undercut groove including inwardly extending ledges having outer and inner surfaces, the ends of the grooves in said abutting members being coterminous to form in effect continuous groove means, an elongate connecting member disposed partially in one groove and partially in the other, thereby forming a junction between said members, and a pair of screws in said connecting member passing between said ledges with their heads against the outer surfaces of said ledges, one screw being disposed in each of said grooves thereby to bring said connecting member into frictionally binding engagement with the inner surfaces of the ledges of each of said grooves to hold said structural members in abutting relation.

14. Structural joint means comprising in combination a pair of structural members in abutting relation, elongate recesses, one in each structural member, extending into said members from abutting surfaces, said recesses being coterminous to constitute in effect elongate recess means, a pair of slots, one in each structural member communicating with surfaces of said members and with at least a portion of said recesses, said slots being narrower than said recesses, thereby leaving pairs of ledges bordering the slots, overhanging the recesses, and having external and internal surfaces, an elongate connecting member disposed in said recesses, and a pair of screws threaded into said connecting member, one in each of said slots, passing between said ledges and having their heads bearing against the external surfaces of said ledges, thereby frictionally clamping said connecting member against the interior surfaces of said ledges to hold said structural members in abutting relation.

JOHN R. SCHMIDGALL.

References Cited in the file of this patent

UNITED STATES PATENTS

| Number | Name | Date |
|---|---|---|
| 888,280 | Watt | May 19, 1908 |
| 1,385,958 | Van Fleet | July 26, 1921 |
| 1,540,482 | Landaal | June 2, 1925 |
| 1,660,933 | Obergfell | Feb. 28, 1928 |
| 2,081,722 | Weinzierl | May 25, 1937 |
| 2,109,330 | Compton | Feb. 22, 1938 |

FOREIGN PATENTS

| Number | Country | Date |
|---|---|---|
| 203,386 | Switzerland | Oct. 2, 1939 |
| 302,256 | Italy | Oct. 22, 1932 |
| 460,195 | Great Britain | Jan. 20, 1937 |